Patented Feb. 9, 1943

2,310,785

UNITED STATES PATENT OFFICE 2,310,785

UPHOLSTERING MATERIAL

Conrad Herrmann, Wuppertal-Elberfeld, Germany; vested in the Alien Property Custodian No Drawing. Original application November 5, 1937, Serial No. 173,043. Divided and this application July 21, 1939, Serial No. 285,727. In Germany November 5, 1936

3 Claims. (Cl. 154—54)

The present invention relates to the manufacture of material of artificial origin but more specifically has for its purpose to devise a process for the manufacture of material suitable for use in upholstering.

Films, particularly those of cellulosic origin, are cut into fine ribbons of approximately the thickness of horse hair. However, this ribbonlike horse hair cut from an ordinary cellulose film is not suitable for upholstering and filling purposes, since there is no crimping or fullness in the material. It is of course possible to subject the ribbons thus produced to well known crimping processes, for example, as carried out with respect to horse hair and similar animal hair as well as other upholstering material. However, it has been found that the crimping effect, particularly with ribbons, is not sufficiently lasting in effect.

It is therefore one of the objects of the present invention to produce a sufficiently durable crimping of the cellulose ribbons for upholstering material. This and other objects will in part become obvious and in part be pointed out in the following specification and appended claims.

The invention is based upon the well known fact that if two differently shrinking cellulose films are glued together, the combined product, after remoistening or steaming, has a tendency to shrink easily whereby the cellulose film having a higher shrinkage capability forms the inner layer while that having a lower shrinkage capacity forms the outer layer of the combined product.

This novel process utilizes this generally known fact and combination by means of gluing two different cellulose films which possess different shrinkage capabilities. In carrying out this process a cellulose film which has been greatly stretched during its manufacture is combined with the cellulose film which has been produced with a less amount of longitudinal stretch. The two films are bonded together and are thereafter outshrunk so that the residual capacity for shrinkage of the two films will be substantially the same in the final product. Because of the difference in initial capacity for shrinkage, however, one of the films will be permanently under tension and the other permanently under compression, thereby causing a curl.

A further step in the process may consist in the use of a film, spun, for example, from a viscose solution, then washed and after-treated but not dried, and that this film is then combined with another cellulose film which is either produced from the same solution or any other cellulose solution but which has already been dried. It is also possible to produce a combined product in such a manner that a film made from a viscose or cuprammonium solution is combined in the usual manner by any suitable means with another film-like product, such as, for example, an acetate film, or a sheet of kraft brown paper. The best results, however, are obtained in all instances if films of different thickness are combined with each other.

The gluing of the cellulose films may be carried out in any suitable manner whereby the adhesion power of the films which have been swelled up to a high degree and the simultaneous use of pressure by means of pressing rollers and heat may be utilized. This step in the process may be carried out by using heated press rollers so that the pressure and heat are obviously applied simultaneously. It is further possible to use special gluing mediums, such as viscose solutions or cuprammonium solutions, also other gluing agents, for example, of animal nature, such as casein preparations.

The glued films are then suitably dried, preferably in a continuous operation.

In accordance with one form of the invention, the combined films thus produced can be then cut into small ribbons in a longitudinal direction.

One method of cutting the films into ribbons may be accomplished by rolling the combined films into a tight roll and then cuting into ribbons cross-wise, with respect to the axis of the roll. Whichever method of cutting is used, the ribbons may be subjected to a swelling aftertreatment, for example, with water or steam, in order to release the different shrinkage capabilities of the individual portions of the ribbons and to allow the spiral-like crimping action to take place, whereupon the ribbons are dried and hardened.

In order to produce a material which greatly resembles upholstering materials of natural fibers and their useful properties, the finished ribbons may be impregnated with substances which increase the water repelling characteristics of the finished material, making the said material more impenetrable by water. This impregnation may also be carried out in connection with the shrinking and/or swelling process, or in connection with the gluing of the elementary films. Substances suitable for this purpose are those usually employed in the water-proofing of cellulose films, for example, ester lacquers, nitrocellulose, paraffin, mineral waxes and their finishing products, resins of all kinds, metal soaps, etc.

If impregnating agents are used which prevent, to a great degree, the swelling and shrinking of the film parts, it is advisable to carry out the impregnation of the upholstering material only after the spiral formation has taken place in the shrinking process through the after-swelling.

The term "outshrunk," as used in the specification and claims hereof, defines a cellulosic body having substantially no residual capacity for shrinkage upon being wetted and dried.

It is obvious that many variations may be made in the process described herein while utilizing the invention of the present application and it is not intended to restrict the invention to the particular descriptions or examples given herein. The terms used in describing the invention have been used in their descriptive sense and not in terms of limitation, and it is intended that all equivalents thereof be included within the scope of the appended claims.

This is a divisional application of my application, Serial No. 173,043, filed November 5, 1937, Patent No. 2,209,919, entitled "Process for the manufacture of upholstering material."

What is claimed is:

1. As an upholstery material, a dry body consisting of two laminae of regenerated cellulose intimately bonded together, said body being of about the thickness of horsehair, one of said laminae being under compression and the other under tension to bias the body into spiral form, both laminae being outshrunk and characterized by their ability to retain their respective compression and tension under the influence of moisture.

2. An upholstery material as defined in claim 1 in which one of said laminae is thicker than the other.

3. An upholstery material as defined in claim 1 in which at least one of the laminae is of cellulose regenerated from cuprammonium cellulose.

CONRAD HERRMANN.